(No Model.) 4 Sheets—Sheet 1.

W. W. BURSON.
LOW LEVEL SELF BINDING HARVESTER.

No. 347,769. Patented Aug. 24, 1886.

Witnesses:
John B. Kaspari
John F. Steward

Inventor:
William W. Burson

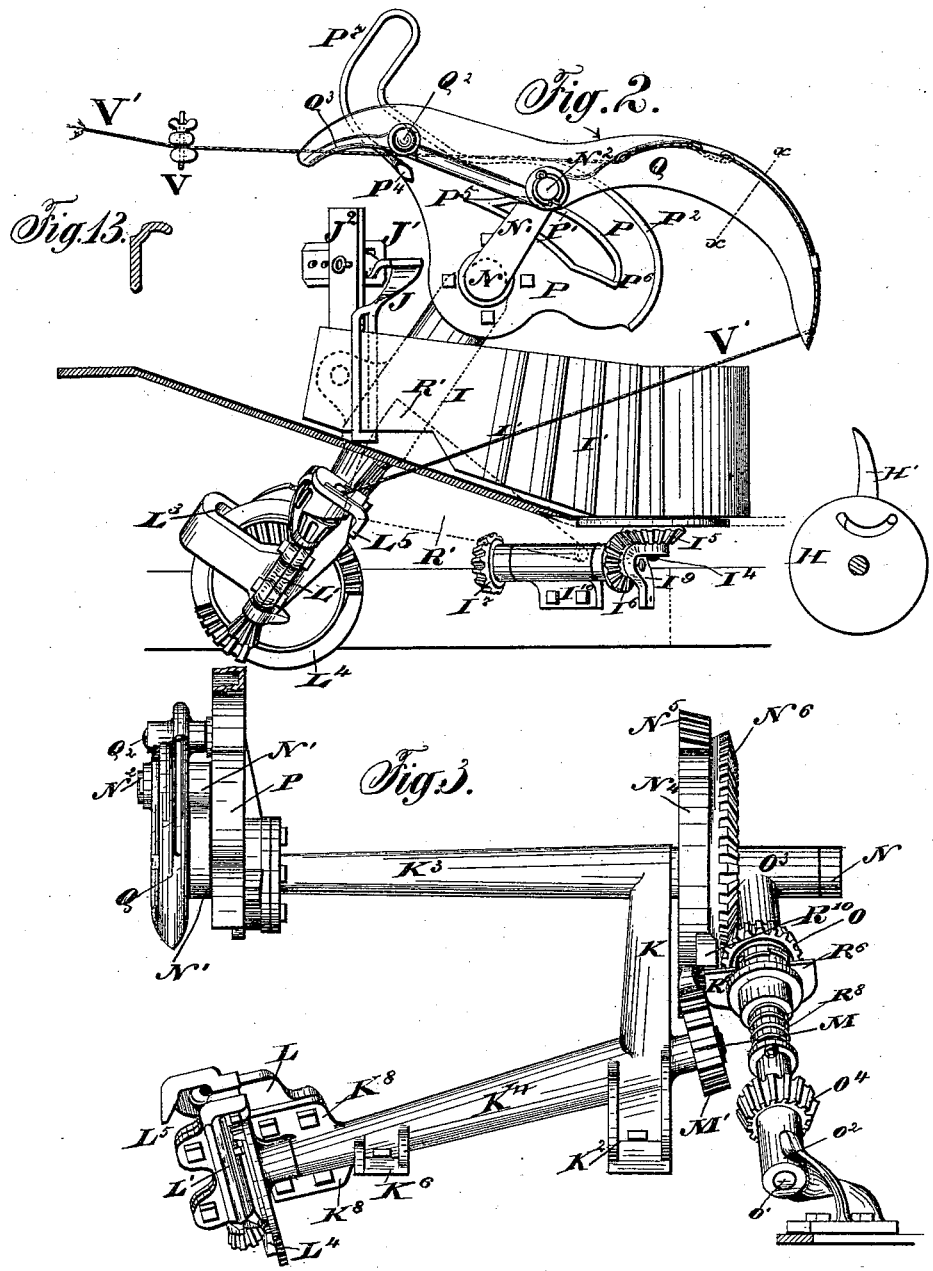

(No Model.) 4 Sheets—Sheet 3.

W. W. BURSON.
LOW LEVEL SELF BINDING HARVESTER.

No. 347,769. Patented Aug. 24, 1886.

Witnesses:
John B. Kaspari
John F. Steward

Inventor:
William W. Burson (No Model.) 4 Sheets—Sheet 4.

W. W. BURSON.
LOW LEVEL SELF BINDING HARVESTER.

No. 347,769. Patented Aug. 24, 1886.

Witnesses:
John B. Kaspari
John F. Steward

Inventor:
William W. Burson

N. PETERS, Photo-Lithographer, Washington, D. C.

UNITED STATES PATENT OFFICE.

WILLIAM W. BURSON, OF CHICAGO, ILLINOIS.

LOW-LEVEL SELF-BINDING HARVESTER.

SPECIFICATION forming part of Letters Patent No. 347,769, dated August 24, 1886.

Application filed November 30, 1883. Serial No. 113,098. (No model.)

*To all whom it may concern:*

Be it known that I, WILLIAM W. BURSON, of Chicago, in the county of Cook and State of Illinois, have invented certain new and useful Improvements in Low-Level Self-Binding Harvesters, of which the following is a full description, reference being had to the accompanying drawings, in which—

Figure 1:
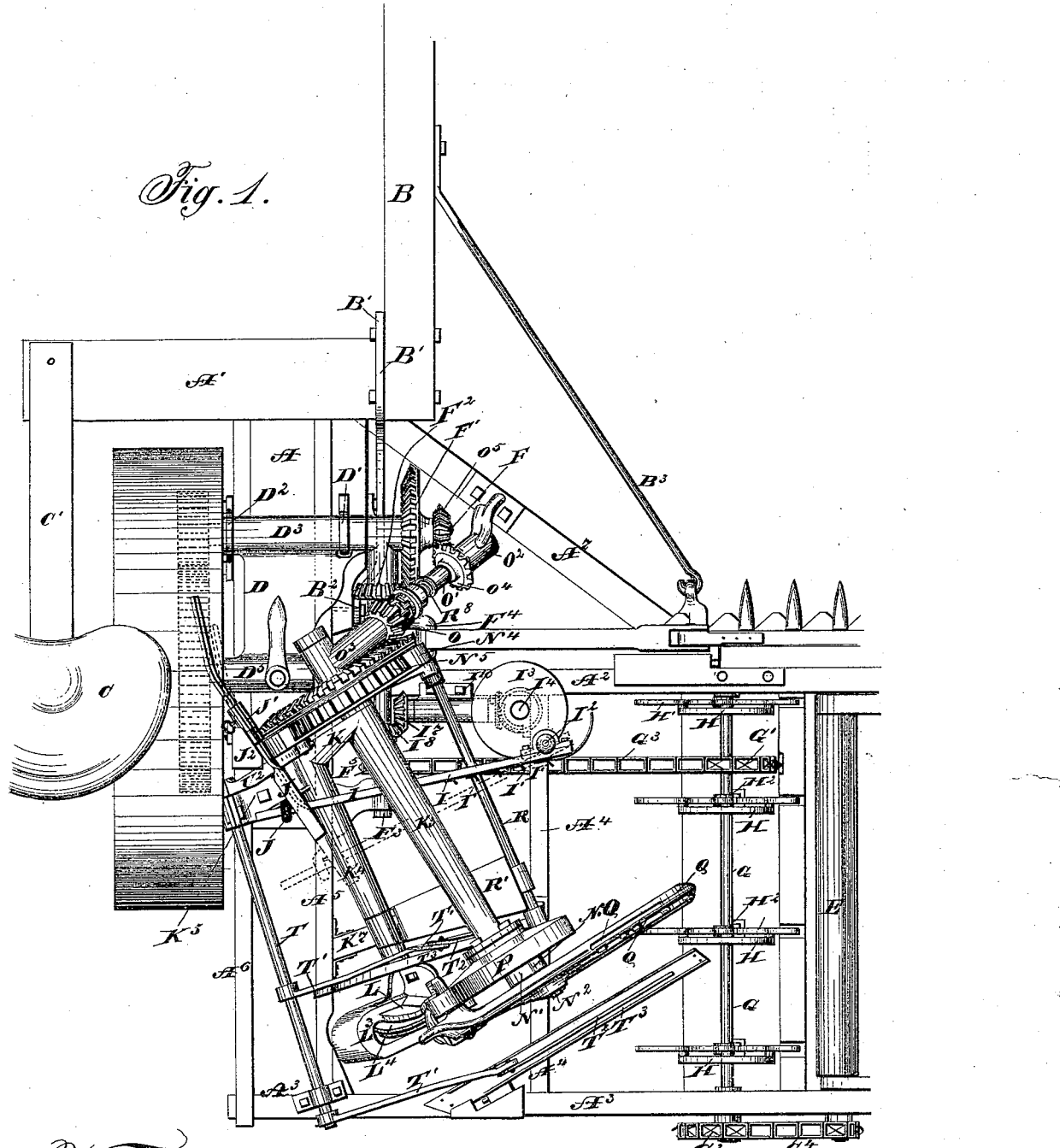
Figure 4:
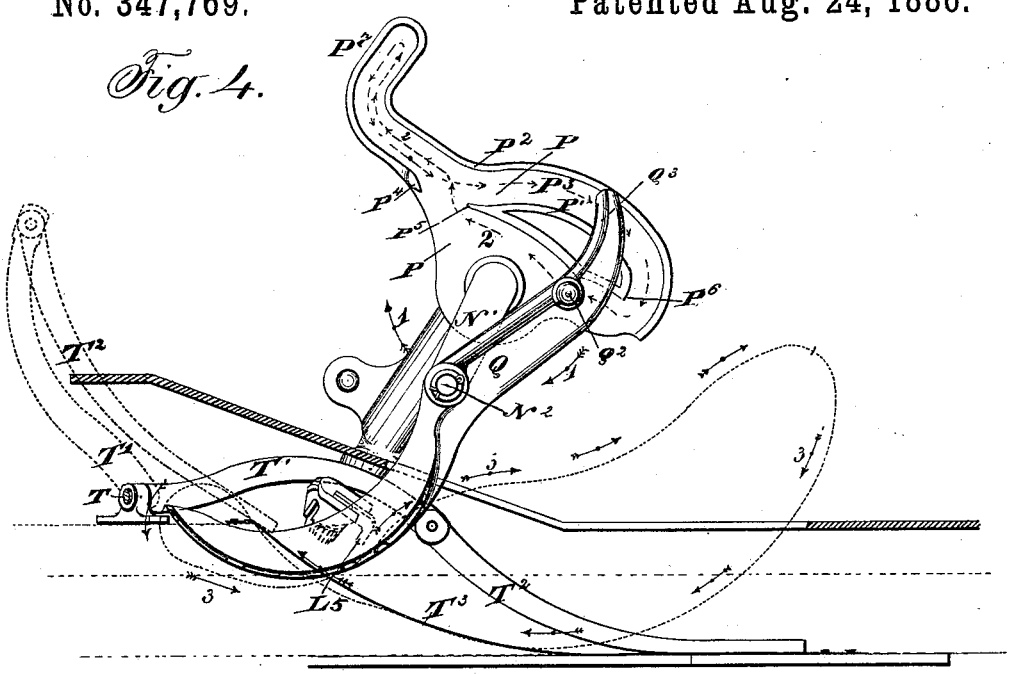
Figure 5:
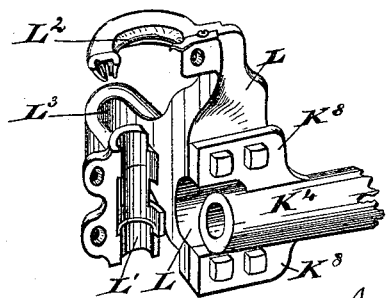
Figure 6:
Figure 7:
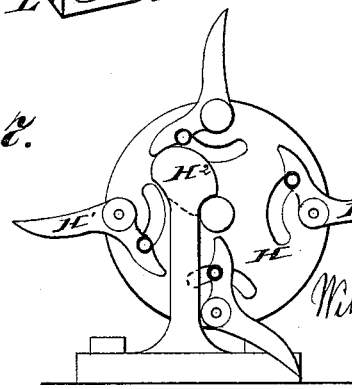
Figure 8:
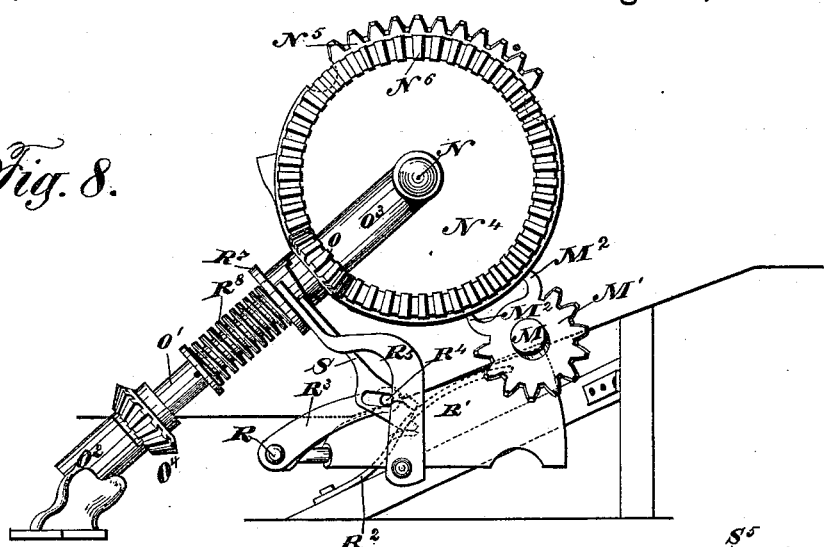
Figure 9:
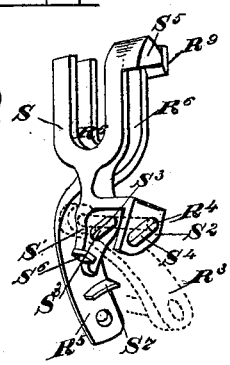
Figure 10:
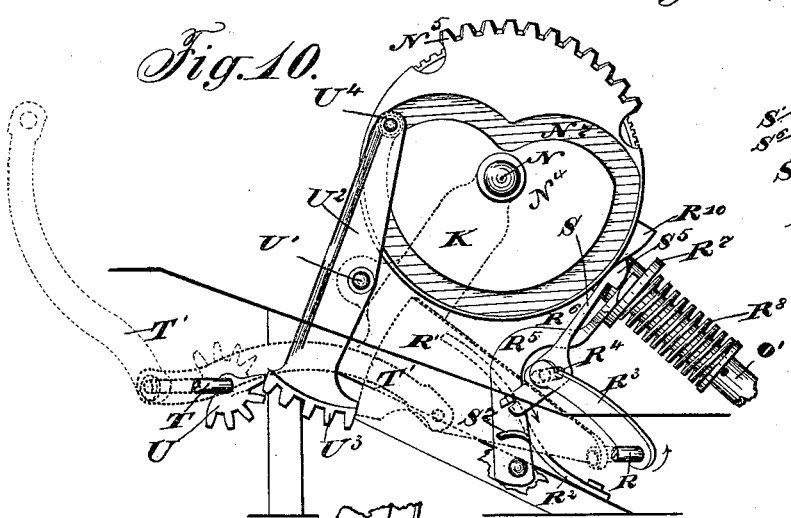
Figure 11:
Figure 12:

Figure 1 is a plan view. Fig. 2 is a rear view of the binder as seen from a position in rear of the machine, looking parallel with the needle-shaft of the binder. Fig. 3 is a grain-side view of the binder. Fig. 4 is a rear view of the binder-frame, needle-crank, cam, and needle, introduced to illustrate the movements of the said needle. Fig. 5 is a perspective view of the knotter-frame. Fig. 6 is a perspective view of the cap for the same. Fig. 7 is an end view of one of the conveyer-wheels. Fig. 8 is a front view of the binder driving-gearing and clutching device. Fig. 9 is a perspective view of the device for forcing disengagement of the clutch. Fig. 10 shows the tripping and bundle-discharging mechanism. Fig. 11 is a rear view of the clutch and gag. Fig. 12 is perspective view of the gag and the slide which coacts with it. Fig. 13 is a cross-section of the needle, as if cut on the line $x\,x$ of Fig. 2.

In the drawings, A is a strong wooden bed-piece, having the longer bars $A^5$ and $A^6$ bolted to its edges.

$A'$ is a foot-rest bolted across the front end of the bed-piece A. Bolted beneath A and projecting to the right is the finger-bar $A^2$.

Reaching from the plank $A'$ to the finger-bar $A^2$, near to the shoe, is the brace $A^7$.

$A^3$ is the rearmost platform sill. To this and beneath the finger-bar are nailed the usual platform bottom boards.

$A^4$ is an additional cross-bar, connecting $A^2$ and $A^3$.

B is the draft-tongue bolted to an iron extension, $B'$, which reaches backward to the side of the bar $A^5$, where, by means of the bolt $B^2$, it is pivotally secured.

$B^3$, is a brace bolted to the tongue and pivotally connected with the shoe, so nearly in line with the pivot of $B^2$ as to permit the frame to rock without swaying the tongue perceptibly. The tongue is thus pivoted to permit tilting, which last may be done by any of the usual methods.

C is the seat, mounted upon the spring $C'$, which is bolted to the board $A'$.

D is a strong metallic arm, having the sleeve $D^3$ secured to the bed-piece A, by means of the yokes $D'$ and $D^2$, so as to be capable of being raised or let fall at will. The arm terminates rearwardly in the sleeve $D^5$. Projecting from this last-named sleeve is a strong stud, which forms a support and axle for the master-wheel.

Through sleeve $D^3$, and having bearings therein, extends a shaft, F, from which power is imparted to the cutting and delivering apparatus and to the binding apparatus.

Upon the grain side of the master-wheel is a gear, and upon the shaft F is a pinion, the two properly meshing together. (Shown in dotted lines in Fig. 1.)

The raising and lowering of the main frame is accomplished by a screw and threaded lever, which draws the frame nearer to or permits it to fall farther from the axle. The axle and the pinion-shaft both being in the arm D, the depth of mesh is not varied as the raising and falling takes place.

Crossing the platform in the usual place in this class of machines is the roller E, over which the delivery-canvas is drawn and by which it is moved.

The cutting apparatus is of the usual form of construction.

$F'$ is a bevel-gear keyed to the shaft F, which meshes into the pinion $F^2$ on the shaft $F^3$, which is free to revolve in suitable bearings on the frame.

$F^4$ is a crank formed by bending the shaft $F^3$, to which is connected the sickle-driving pitman.

G is a shaft crossing the platform parallel with the roller E, and so close to the latter that the conveying-wheels carried by the shaft may take the straw from the canvas.

On the shaft $F^3$ is the sprocket-wheel $F^5$, and on shafts G is the sprocket-wheel $G'$. Connecting the sprocket-wheels is the chain $G^3$.

Upon the rear end of the shaft G is the sprocket-wheel $G^2$, and upon the like end of the roller-shaft is also a sprocket-wheel. Around this is thrown the chain $G^4$. By means of these sprocket-wheels and chains motion is imparted to the platform-carrier canvas.

Distributed along the shaft G are the conveying-wheels H, each armed with angular falling teeth H', which are controlled by a cam-shaped termination of the standard H², which is bolted to the platform adjacent to each wheel. The binder-table (shown edge view in Fig. 4) lies immediately over the shaft G and chain G³, and the teeth of H' work through suitable slots. The grain-receiving platform being mainly abreast of the master-wheel, I locate mechanism along and upward from the surface of the binder-table to act upon the butts of the grain forming the swath and to advance the same, and at the same time deflect it backward at an angle oblique to the direction of movement of the carrier-canvas. This change of direction I produce by means of a pivoted butting-board, I, of such width as to act upon the full depth of the swath presented to it, and of such length as to take the grain delivered by the conveying-teeth well through the binder. The board is provided with transverse flanges I', in order that it may act aggressively upon the grain to advance the butts. The grain end of the board is mounted upon and carried by the elongated wrist I², projecting upward from the disk I³, which revolves on a vertical axis, the stud I⁴ projecting upward from the bracket I⁹, bolted to the finger-bar. The disk has upon its nether surface the bevel-gear I⁵, into which meshes the gear I⁶, secured to the shaft which revolves in the sleeve-like bearing I¹⁰, bolted to the finger-bar. This shaft has also secured to it, at the stubble end, the gear I⁷, which is in position to be engaged by the gear I⁸ on the shaft F³. The stubble end of the butting-board is guided by an adjustable loop, through which it slides longitudinally as it is carried by the crank.

In order to vary the amount that the swath is deflected backward in operating upon long or short grain, I make the guiding-loop J adjustable fore and aft, by sliding it through the support J' on the post J². A series of holes is provided in the horizontal stem of J, and a pin is inserted through them and through the post and the walls of J'.

In operating on long grain, the parts will be adjusted to the position shown in full lines in Fig. 1, but for short grain they will be moved to the position shown by the dotted lines.

I construct the binder-frame in general form, substantially like the letter U turned upon its side, as shown in Fig. 3; but instead of having the overreaching sleeve, which forms the support and bearing for the needle-shaft, parallel with the underlying sleeve, as has usually been done, I make them divergent, so that, although the distance between the shafts at the position where the band-carrying arm and the knotter are located is necessarily such as to permit the largest bundle to pass beside the space occupied by the knotter-head, they are at the ends where connected so near as to require only gears of moderate size. Reference to Fig. 3 will show that at the narrow end of the frame more room is still given for the passage of the grain than is at the center of the straw, where the band is placed. The upright connecting member K of the frame terminates at its base in a broad foot, which I bolt to a strong flat bar, K⁵, which is secured near the stubble end of the finger-bar, and passes backwardly to the plank A. (See Fig. 1.) From preference I make the sleeve K³ of the frame horizontal, and that K⁴ inclined downward, yet in some constructions this may be reversed. Projecting from the sleeve K⁴, well out from K², is the foot K⁶, which is fitted to the bar K⁷, which foot, on account of the slope of the sleeve K⁴, needs not to be as long as its mate, the foot before mentioned.

K⁸ are lugs cast near the extreme end of the sleeve K⁴, to which the knotter-frame L is bolted. Of this frame, L' is the bearing for the knotter-shaft and holder-shaft. L² is a concave in which the knotter moves, and L³ is a space cut away for the knotter-driving gear L⁴.

The knotting and holding devices need no description, as they differ little from the same parts shown in Patents No. 273,811, dated March 13, 1883, and No. 273,812, dated March 13, 1883, issued to me.

Through the sleeve K⁴ reaches the knotter-driving shaft M, having keyed to its rearmost end the knotter-driving gear L⁴, and to the end next to the post K of the frame is keyed the lock-pinion M', having delay-stops M².

Through the sleeve K³ of the frame passes the shaft N, having the crank N' upon its rearward end, said crank provided with a wrist, N². Upon the opposite end of this shaft is placed the wheel N⁴, having the segment N⁵ in place to properly engage the pinion M' at the instant that the needle has carried the twine fully to the knotter. The plane part of the periphery of the wheel serves to act as a check for the pinion M' after the segment has passed the stops M² riding thereon.

The wheel N⁴ has upon its face nearest the frame the cam-groove N⁷, for giving movement to the discharging mechanism.

Upon the foremost face of the wheel N⁴ is the bevel-gear N⁶, into which meshes its driving-pinion O, loosely mounted on the shaft O', which revolves in the bearing O², bolted to the finger-bar, and in the T-box O³, which is mounted on the projecting end of the shaft N.

Near the foot of the shaft O' is keyed the bevel-pinion O⁴, which is meshed into and driven by the pinion O⁵ on the shaft F. The shaft O' runs constantly, and clutching mechanism is employed to engage the pinion O and lock it to said shaft at times, which will be fully described when treating of the gavel-sizing mechanism.

To flanges surrounding the outreaching end of the sleeve K³ is bolted the plate P, provided with a cam-groove for controlling the orbit of the point of the needle.

Referring now to Fig. 4, the cam-plate is shown to have the continuous flange P' and the partial flange P². These form, in the greater part, the walls of a cam-groove, P³.

Q is the needle or band carrying arm, having the wrist of the crank N' passing through it, by which it is carried. To prevent the arm from rotating with the crank, I give the needle an extension in a direction the reverse from that of the point—that is, the operative point of the needle—and this extension reaches in opposite direction from the supporting wrist-pin on the crank. Upon the extension I place the pin Q² and project it toward the cam-plate, and place an anti-friction roller thereon, which travels within the path defined by the walls P' and P². Beyond this roller the needle-extension reaches to form the curved extension Q³. The terminal end P⁴ of the wall P² is thrown so far out from the plane of the plate that the curved extension Q³ shall strike it. I outthrow the part of the cam at P⁷ upwardly, to permit the rollers to have a limited amount of upward throw. The latter finding relief in an upward direction, the point of the needle is not moved as fast nor as high as if the outthrow part continued in the direction in which it leaves the main part of the cam. This is advantageous, because the lower the point of the needle when passing over the mass of grain that has accumulated while binding a previous bundle, the more acute the angle formed by the tense-drawn twine and the arm R', and hence the more favorable to tripping, if the mass is sufficiently large. Besides, I consider this movement more favorable generally to stepping over the mass.

It will be seen that the tense-drawn twine is an element in my self-sizing device. The operation of this device is as follows: The needle-crank is rotated in the direction shown by arrow 1, the position of the rest of the needle being that of elevation, to permit the grain to move under it, we may take that position shown in Fig. 2 as the starting-point. The guide-roller being within the cam-groove, the needle will, when moved forward, be carried in a definite path, but at the instant that the roller is passing the space between the termination P⁴ of the flange P² and P⁵, the roller might be forced therethrough were it not prevented by the curved extension Q³ striking P⁴. The curved extension Q³ draws along on the projection P⁴ until the roller has passed the open space described, when it is again fully controlled by the cam-groove. The roller moves, as indicated by arrows 2, which directs the point of the needle so as to pierce the swath and carry the mass thus cut toward the knotting mechanism, and to place the twine carried by the needle in such a position relative to the knotter as to lay the said twine fully into position to be engaged when the operation of knotting begins. The turning of the knotter is such that it begins its revolution while the guided roller is traversing the part P⁶, at that time the needle being thrust. The knotter having engaged the twine, the needle may continue onward without making any stop or delay, and this it does. When in the position in which it is when the twine is taken from it, it has been carried so far as to strike the projection L⁵ on the knotter-frame; but at the instant of such contact the guide-roller has passed off from the part P⁶ of the cam and relief is found in the roller traveling freely along the under side of the lower margin of the wall P'. The crank moving on, the needle will rock on its place of contact with L⁵ for a time. It soon moves so far that the curved extension Q³ will strike the projection P⁴, and the roller will be guided to enter again between the walls of the cam. The curvature of the cam is such that the needle is withdrawn wholly above the table and returned to its position of rest, as shown in Fig. 2.

The line of travel of the point of the needle is indicated by dotted lines and arrows 3, in Fig. 4.

The part of my needle which comes in contact with the gavel I construct as shown in section in Fig. 13, and shape my knotter-frame so that the thin margin will press just outside of L⁵ and the twine pass upon the other side, and by said piece L⁵ be guided into the knotter.

V is the tension, located at any suitable place on the machine and adapted to give proper resistance to the twine V'. The latter is brought from the ball, and, after passing the tension, is threaded through the needle, as shown, and is grasped by the holder. It will be seen that the relative position of the twine and the arm R' form an acute angle, into which the grain is forced.

R, Figs. 8 and 10, is a rock-shaft supported in suitable bearings on the frame, and having rigidly secured thereto the arm R', made of sheet metal, with folded edges for strength and lightness.

R² is a spring secured to the frame-work at one end, its free end resting beneath arm R', and thus elastically retaining it in position to receive the gavel. The spring is made so sensitive that the slight pressure caused by the gravity and compaction of a mass shall depress it; but if packers are used with any other resistant opposing its trip-arm than the tense-drawn twine, the spring may be much stiffer.

R³ is an arm secured to the shaft R, which reaches from a position beneath the shaft O' in a direction substantially parallel with the arm R' for a short distance, where it is provided with a strong wrist-pin, R⁴.

R⁵ is an arm pivoted to the frame-work, which reaches upward and terminates in the crotch R⁶, which straddles the cylindrical clutch R⁷, and rides upon the flange of the latter. This clutch is provided with teeth that mesh with the same on the pinion O. The clutch is splined to the shaft O', and is held into contact with the pinion O by the spring R⁸, suitably supported by a collar on the shaft.

S is a metallic frame, constructed as shown in Fig. 9, with a crotch to straddle the clutch R⁷ (this is in part to hold it in place) and ride on the flange, and having two lugs, S' and S², provided with the slots S³ and S⁴, into which the wrist-pin R⁴ rests, which slots are diagonal to a line drawn from the axis of the shaft R to the wrist-pin R⁴. The frame is in part supported by this wrist-pin, and is further steadied in place by having its top crotched to straddle the clutch. One of the members forming the crotch of the arm R⁵ is provided with a projection, R⁹, sloping, as best shown in Fig. 12. The corresponding member forming part of the crotch of frame S is provided with a wedge, which is in effect a gag.

R¹⁰ is a cam, thrown abruptly out from the face of the wheel N⁴ in such a position as to come in contact with the member of the crotch of S having the gag S⁵ when the latter is thrown in its way. The lower extremity of the frame S, which projects beyond the wrist-pin R⁴, is notched to step onto the projection S⁶ when this frame lies alongside of the arm R⁵.

S⁶ is an angular projection reaching from the side of the arm R⁵, in place to receive the notch in the lower extremity of S when the parts are in the relative position shown, Figs. 9 and 10.

The operation of the tripping mechanism is as follows: The pressure of the grain depresses the arm R', rocking the shaft R, and hence the arm R³ and the wrist-pin R⁴ are caused to move in the slots S³ S⁴. The slots being inclined in relation to the direction which the pin moves, and the frame being estopped from moving in the direction of that of movement of the pin by the notch in the lower extremity of S, resting on the projection S⁶, the only relief to the pressure of the pin is in the direction of moving the estopped end of frame S off from the projection S⁶. By this time the wrist-pin R⁴ has reached the ends of the slots, and any further movement will draw the frame downward, and the gag S⁵ will be drawn down the incline of R⁹, when the parts will be in the positions shown in Fig. 8. While in these positions the clutches are permitted to engage, and are forced to do so by the spring R⁸, and the pinion being locked to the constantly-rotating shaft the wheel N⁴ is put in rotation. Upon the removal of the bundle, after the operation of binding, the tripping-arm R' is permitted to rise and the parts to assume the positions shown in Fig. 10—that is, the gag S⁵ resting on the incline R⁹ and the notch resting on its stop S⁶. This is brought about by the spring R² rocking the shaft R and lifting all the parts back to place. It will be seen that the incline R⁹ and S⁵ fill the whole space between the flange of R⁷ and the periphery of the wheel. The continued rotation of the wheel N⁴ brings the cam R¹⁰ into contact with the gag S⁵, which, together with the whole frame and arm R⁵, are thrust away, and by R⁵ the clutch is slid on its shaft. This disengagement is produced at the completion of each revolution.

Crossing the frame-work of the platform, near the delivery end thereof and beneath the table, is the rock-shaft T, having the arms T' T' secured thereto, each so long as to reach from the shaft to a position beyond the knotter, so that they shall extend so far as to fully underreach the bundle. The rocking of this shaft for about one-third of a revolution will be sufficient to cause the arms to throw the bundle from the machine.

To prevent straws from getting under the arms, to interfere with their proper working and return to place of rest below the table, I hinge to them the arms T² T², the free ends of which slide along in a groove, T³ T³, formed by turning up the edges of a piece of sheet-iron. So constructed, even though the straws follow the ejecting-arms T' T' in their outward movement, the arms T² T² will, in their reverse movement, have left the straws so that the arms T' T' will move under them.

Keyed to the shaft T, beneath the forward end of the binder-frame, is the fragmentary pinion U.

Upon a pin, U', projecting from a lug on the main frame, is pivoted the vibrating lever U², having the segment U³, which meshes into the segmental pinion U, and having at its upper extremity the roller U⁴, which enters the groove N⁷ on the rear face of the wheel N⁴. This cam-groove is of such contour that the roller is at one time brought promptly to a position near the axis and then thrown outward. The lever is thus vibrated on its axis, and the parts being suitably timed the arms are moved to eject the bundle and to return to place once during each revolution of the gear, and hence each operation of the binding mechanism.

What I claim is—

1. In a grain-binder, the combination, with the clutch R⁷, of the arm R⁵, adapted to rest upon the same and having the incline R⁹, and the frame S, having the gag S⁵, the latter connected with and adapted to be moved by the tripping mechanism of the grain-binder to rest upon and withdraw from the incline R⁹, substantially as described.

2. The combination of the arm R⁵, having the incline R⁹, the frame S, having the gag S⁵, the cam R¹⁰, and mechanism, substantially as described, for connecting the frame with the trip-arm R', all combined substantially as described.

3. The arm R⁵ and the frame S, each constructed and adapted to co-operate, substantially as described, in combination with the tripping mechanism, as and for the purpose set forth.

4. The combination of the arm R³, having the pin R⁴, the frame S, mounted thereon, the arm R⁵, having the incline R⁹, and the clutch, substantially as described.

5. The crank M', the needle mounted on the wrist thereof and provided with the extension having the curved extension Q³, combined with the cam-groove P³ and the projection P⁴, substantially as described.

6. The crank N', the needle mounted on the wrist-pin thereof and carried thereby, said needle provided with the roller at $Q^2$, in combination with the cam-plate located, substantially as shown, in relation to the said crank, and having the cam-groove outthrown at $P^7$, substantially as described.

7. The rock-shaft having the arms $T'$ $T'$ secured thereto, the segmental pinion $U$, the vibratory lever $U^2$, having the segment $U^3$ and the guide-roller $U^4$, and the wheel having the cam-groove $N^7$, all combined substantially as described.

8. The combination of the trailing arms $T^2$ $T^2$ with the ejecting-arms $T'$ $T'$, substantially as described.

WILLIAM W. BURSON.

Witnesses:
JOHN B. KASPARI,
JOHN F. STEWARD.